US010300933B2

(12) United States Patent
DeBry

(10) Patent No.: US 10,300,933 B2
(45) Date of Patent: May 28, 2019

(54) CONVERTIBLE CARGO CASE

(71) Applicant: RADIO FLYER INC., Chicago, IL (US)

(72) Inventor: Garrett Lyle DeBry, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 15/982,172

(22) Filed: May 17, 2018

(65) Prior Publication Data

US 2018/0334181 A1 Nov. 22, 2018

Related U.S. Application Data

(60) Provisional application No. 62/507,345, filed on May 17, 2017.

(51) Int. Cl.
*B62B 3/00* (2006.01)
*B62B 3/02* (2006.01)

(52) U.S. Cl.
CPC .............. *B62B 3/005* (2013.01); *B62B 3/007* (2013.01); *B62B 3/025* (2013.01); *B62B 2205/30* (2013.01)

(58) Field of Classification Search
CPC ......... B62B 3/005; B62B 3/007; B62B 3/025; B62B 3/027; B62B 3/022; B62B 2205/30; B62B 2205/0013; B62B 2205/04
See application file for complete search history.

(56) References Cited

U.S. PATENT DOCUMENTS

| | | |
|---|---|---|
| 1,505,182 A | 8/1924 | Wrixton |
| 2,558,372 A | 6/1951 | Nidermayer, Jr. |
| 2,577,579 A | 12/1951 | Hall |
| 2,635,797 A | 4/1953 | Siebert |
| 4,830,238 A | 5/1989 | Widinski et al. |
| 5,765,868 A | 6/1998 | Ventrone et al. |
| 6,170,854 B1 | 1/2001 | Maher et al. |
| 6,491,318 B1 | 12/2002 | Galt et al. |
| 7,036,699 B1 | 5/2006 | Hay et al. |
| 8,011,686 B2 | 9/2011 | Chen et al. |
| 8,162,349 B1 * | 4/2012 | Roselle ................... B62B 1/008 280/639 |
| 8,220,824 B2 | 7/2012 | Chen et al. |
| 8,317,219 B2 * | 11/2012 | Bruce ................... B62B 5/0013 280/47.26 |
| 8,388,015 B2 | 3/2013 | Chen |
| 8,814,193 B2 * | 8/2014 | Barnes ................. B62K 27/006 280/204 |
| 8,827,282 B2 * | 9/2014 | Schlegel ................. B62B 3/106 224/401 |

(Continued)

*Primary Examiner* — Bryan A Evans
(74) *Attorney, Agent, or Firm* — Barnes & Thornburg LLP

(57) ABSTRACT

A convertible cargo case for a wagon is provided. The cargo case has a housing having a first side wall, a second side wall opposing the first side wall, a third side wall joining the first side wall and the second side wall, a fourth side wall opposing the third side wall and joining the first side wall and the second side wall, and a bottom wall joining a bottom end of the first side wall, second side wall, third side wall and fourth side wall to define a cavity. A connector extends from the cavity. The connector has a receiver for removably securing the housing to the wagon, wherein the housing is convertible between three configurations: an open cargo configuration, a closed cargo configuration, and a wagon storage configuration.

20 Claims, 6 Drawing Sheets

(56) References Cited

U.S. PATENT DOCUMENTS

| | | |
|---|---|---|
| 8,973,940 B2 | 3/2015 | Chen et al. |
| 9,033,361 B2 | 5/2015 | Frankel et al. |
| 9,073,564 B2 | 7/2015 | Yang et al. |
| 9,085,311 B1 | 7/2015 | Chen |
| 9,101,206 B1 | 8/2015 | Chen et al. |
| 9,145,154 B1 | 9/2015 | Horowitz |
| 9,211,897 B2 | 12/2015 | Yang et al. |
| D748,739 S | 2/2016 | Horowitz |
| 9,440,668 B1 | 9/2016 | Chen et al. |
| 9,580,095 B2 | 2/2017 | Vargas, II et al. |
| 9,623,890 B1 * | 4/2017 | Horowitz ................ B62B 3/022 |
| 9,771,093 B2 | 9/2017 | Horowitz |
| 9,855,962 B1 | 1/2018 | Chen et al. |
| 9,950,727 B1 | 4/2018 | Pang |
| 9,950,729 B2 | 4/2018 | Choi |
| 10,040,470 B1 | 8/2018 | Horowitz |
| 10,106,186 B2 | 10/2018 | Choi |
| 2005/0275195 A1 | 12/2005 | Matula et al. |
| 2006/0198562 A1 * | 9/2006 | Mogil ................ A45C 7/0077 |
| | | 383/121.1 |
| 2006/0283904 A1 | 12/2006 | Dinslage |
| 2011/0169238 A1 * | 7/2011 | Schlegel ................ B62B 3/106 |
| | | 280/47.34 |
| 2012/0235387 A1 * | 9/2012 | Bruce ................ B62B 5/0013 |
| | | 280/651 |
| 2018/0297622 A1 | 10/2018 | Chen et al. |
| 2018/0327011 A1 | 11/2018 | Horowitz et al. |

\* cited by examiner

CONVERTIBLE CARGO CASE

CROSS-REFERENCE TO RELATED APPLICATIONS

This application claims the benefit of U.S. Provisional Patent Application No. 62/507,345, filed May 17, 2017, which is expressly incorporated herein by reference and made a part hereof.

FEDERALLY SPONSORED RESEARCH OR DEVELOPMENT

Not Applicable.

TECHNICAL FIELD

The present disclosure relates generally to cargo cases, and more specifically to a removable and convertible cargo case that is connectable to a wagon, and which can also function as an enclosure for the wagon when the wagon is in the folded configuration.

BACKGROUND

Cargo cases are well known in the art. Similarly, wagons, including folding wagons, are well known in the art. While such cargo cases for wagons, and preferably for folding wagons, according to the prior art provide a number of advantages, they nevertheless have certain limitations. The present disclosure seeks to overcome certain of these limitations and other drawbacks of the prior art, and to provide new features not heretofore available. A full discussion of the features and advantages of the present disclosure is deferred to the following detailed description, which proceeds with reference to the accompanying drawings.

SUMMARY

According to one embodiment, the disclosed subject technology relates to a convertible cargo case for a wagon. The convertible cargo case is preferably convertible between three configurations: an open cargo configuration, a closed cargo configuration, and a wagon storage configuration.

The disclosed technology further relates to a convertible cargo case for a wagon, comprising: a housing comprising a first side wall; a second side wall opposing the first side wall; a third side wall joining one end of the first side wall and one end of the second side wall; a fourth side wall opposing the third side wall and joining an opposing end of the first side wall and an opposing end of the second side wall; and, a bottom wall joining a bottom end of the first side wall, second side wall, third side wall and fourth side wall to define a cavity of the housing; a rigid member at the bottom wall, the bottom wall having an opening therethrough; a connector extending from the cavity, the connector having a pocket for removably securing the housing to the wagon; wherein the housing is convertible between three configurations, an open cargo configuration, a closed cargo configuration, and a wagon storage configuration, and wherein the pocket is removably secured to the wagon in each configuration; and, a securing member connected to one of the second side wall and the connector, the securing member adapted to be secured to a bottom of the housing when the cargo case is in the closed cargo configuration.

The disclosed technology further relates to a convertible cargo case for a wagon, comprising: a housing comprising a first side wall; a second side wall opposing the first side wall; a third side wall joining one end of the first side wall and one end of the second side wall; a fourth side wall opposing the third side wall and joining an opposing end of the first side wall and an opposing end of the second side wall; and, a bottom wall joining a bottom end of the first side wall, second side wall, third side wall and fourth side wall to define a cavity of the housing; and, a connector extending from the cavity, the connector having a receiver for removably securing the housing to the wagon, wherein the housing is convertible between three configurations, an open cargo configuration, a closed cargo configuration, and a wagon storage configuration, and wherein the connector is secured to the wagon in each configuration.

The disclosed technology further relates to a convertible cargo case for a wagon, comprising: a housing comprising a first side wall; a second side wall opposing the first side wall; a third side wall joining one end of the first side wall and one end of the second side wall; a fourth side wall opposing the third side wall and joining an opposing end of the first side wall and an opposing end of the second side wall; and, a bottom wall joining a bottom end of the first side wall, second side wall, third side wall and fourth side wall to define a cavity of the housing; and, a connector extending from the cavity, the connector having a receiver for removably securing the housing to the wagon, wherein the housing is convertible between three configurations, an open cargo configuration, a closed cargo configuration, and a wagon storage configuration, wherein the connector is secured to the wagon in each configuration, and wherein the housing is positioned adjacent a rear of the wagon in the open cargo configuration and closed cargo configuration, and wherein the wagon is positioned partially within the cavity of the housing in the wagon storage configuration.

The disclosed technology further relates to a convertible cargo case wherein the bottom wall has a rigid portion, and wherein the rigid portion of the bottom wall has an opening therethrough. In one embodiment the convertible cargo case further has a rigid pivotable bottom member to selectively cover the opening in the bottom wall.

The disclosed technology further relates to a convertible cargo wherein the first side wall has a first rigid portion and a second rigid portion, and a fold area between the first rigid portion and the second rigid portion.

The disclosed technology further relates to a convertible cargo case wherein the first side wall has a rigid portion thereto, wherein the second side wall has a rigid portion thereto, and wherein the third side wall and fourth side wall have a flexible portion thereto to allow the housing to collapse in the closed cargo configuration.

The disclosed technology further relates to a convertible cargo case wherein the housing is positioned adjacent a rear of the wagon in the open cargo configuration and closed cargo configuration, and wherein the wagon is positioned partially within the cavity of the housing in the wagon storage configuration.

The disclosed technology further relates to a convertible cargo case wherein the connector has a pocket that extends partially over a rear wall of the wagon. In one embodiment, the pocket has cutouts to allow a portion of the wagon to pass through the pocket.

The disclosed technology further relates to a convertible cargo case wherein the connector extends from the one of the second side wall of the housing and the bottom wall of the housing.

The disclosed technology further relates to a convertible cargo case further comprising a securing member connected to one of the second side wall and the connector, the securing member adapted to be secured to a bottom of the housing to retain the housing in the closed cargo configuration.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

Figure 1:
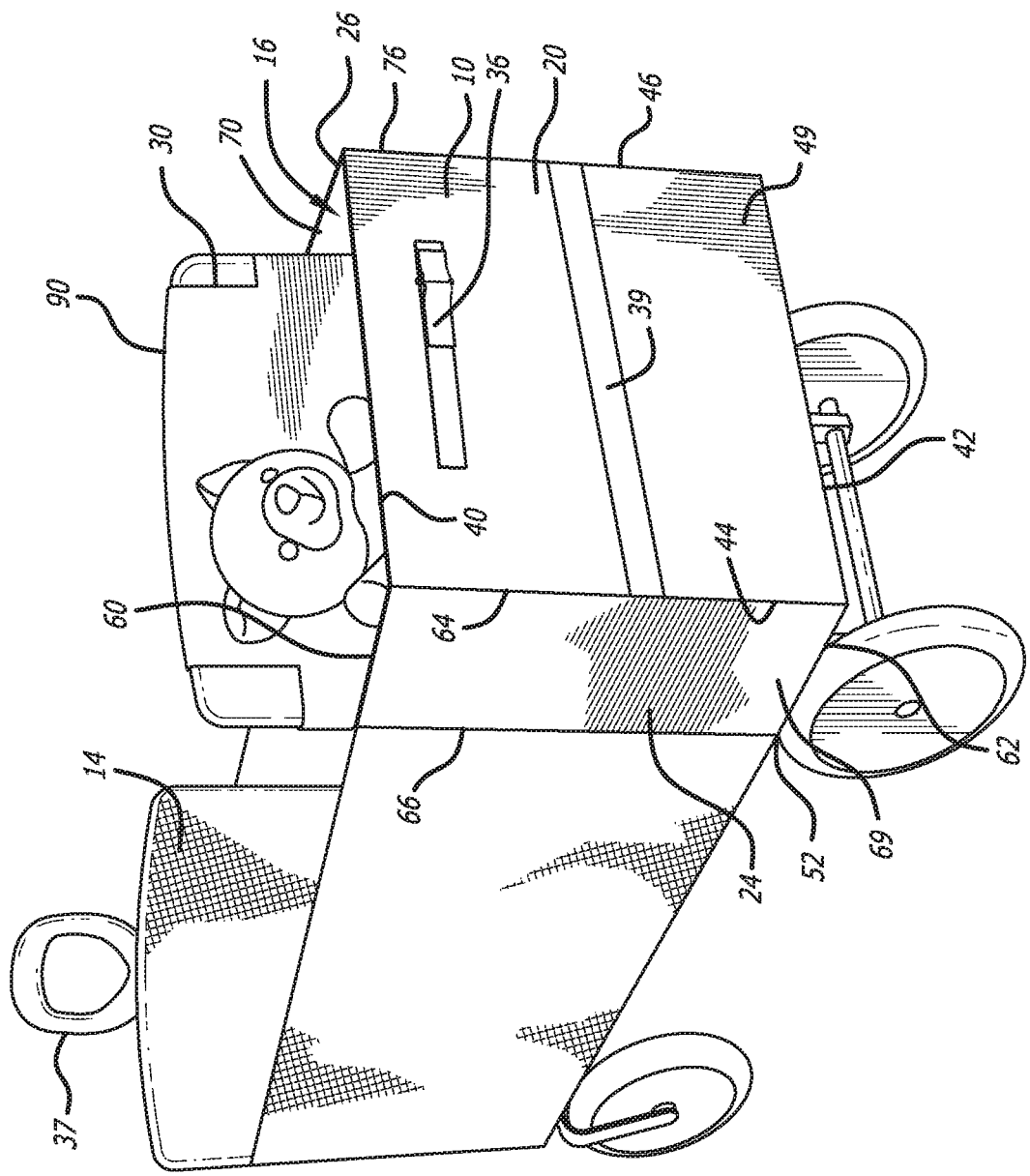
FIG. 1 is a front perspective view of a convertible cargo case according to one embodiment, showing the convertible cargo case in the cargo use position and connected to a foldable wagon in an unfolded or use configuration.

While the convertible cargo case discussed herein is susceptible of embodiments in many different forms, there is shown in the drawings, and will herein be described in detail, preferred embodiments with the understanding that the present description is to be considered as an exemplification of the principles of the foldable wagon and are not intended to limit the broad aspects of the disclosure to the embodiments illustrated.

Figure 8:
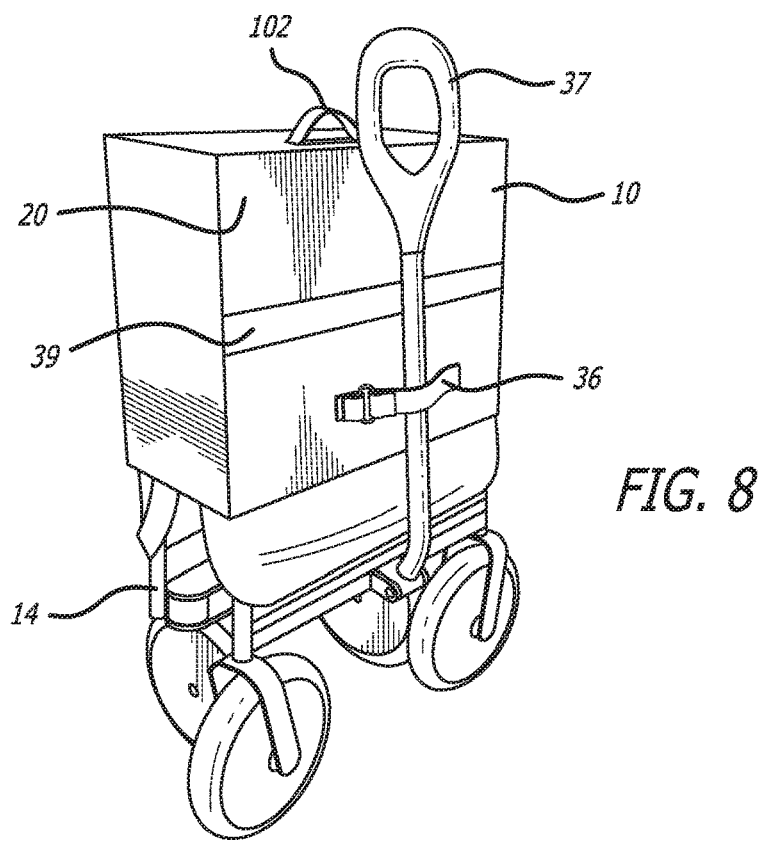
FIG. 8 is a front perspective view of the convertible cargo case in the case use position on a foldable wagon.
Figure 9:
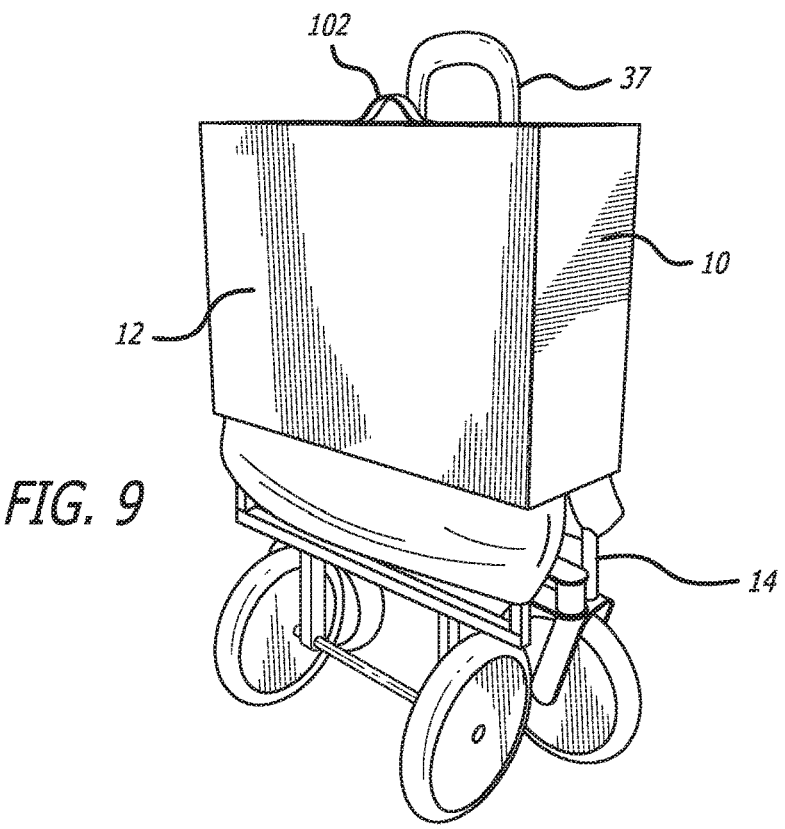
FIG. 9 is a rear perspective view of the convertible cargo case in the case use position on a foldable wagon.

Referring now to the figures, in one embodiment a convertible cargo case 10 is shown and comprises a housing 12 that is convertible between two modes, a cargo mode and a case mode, and three configurations/positions: an unfolded or cargo-use configuration/position (FIGS. 1 and 2), a collapsed or cargo-folded configuration/position (FIGS. 3 and 4), and a storage or case-use configuration/position (FIGS. 8 and 9). In a preferred embodiment the cargo case 10 is removably connected to a ride-on product, such as a wagon 14, which may include a foldable wagon 14 as illustrated in the figures. The foldable wagon 14 may be able to transition from an open position as shown in FIG. 1, to a closed or folded position as shown in FIGS. 8 and 9. The cargo case 10 is adapted to provide a retaining cavity 16 for holding items in the use position as shown in FIG. 1, and when not holding items it is adapted to be folded into the folded position as shown in FIG. 3. Additionally, if connected to a wagon 14 or other ride-on product that is able to fold for storage, when the wagon 14, for example, is transitioned to the folded position the cargo case 10 is adapted to be transitioned to a storage/transportation case as shown in FIGS. 8 and 9 for retaining the wagon 14 in the cavity 16 for storage and/or transportation of the wagon 14 in its folded orientation. In a preferred embodiment, the cargo case 10 is preferably made of a non-rigid material, such as fabric, however, in alternate embodiments it may also have rigid components thereto for strength and stability.

Figure 4:
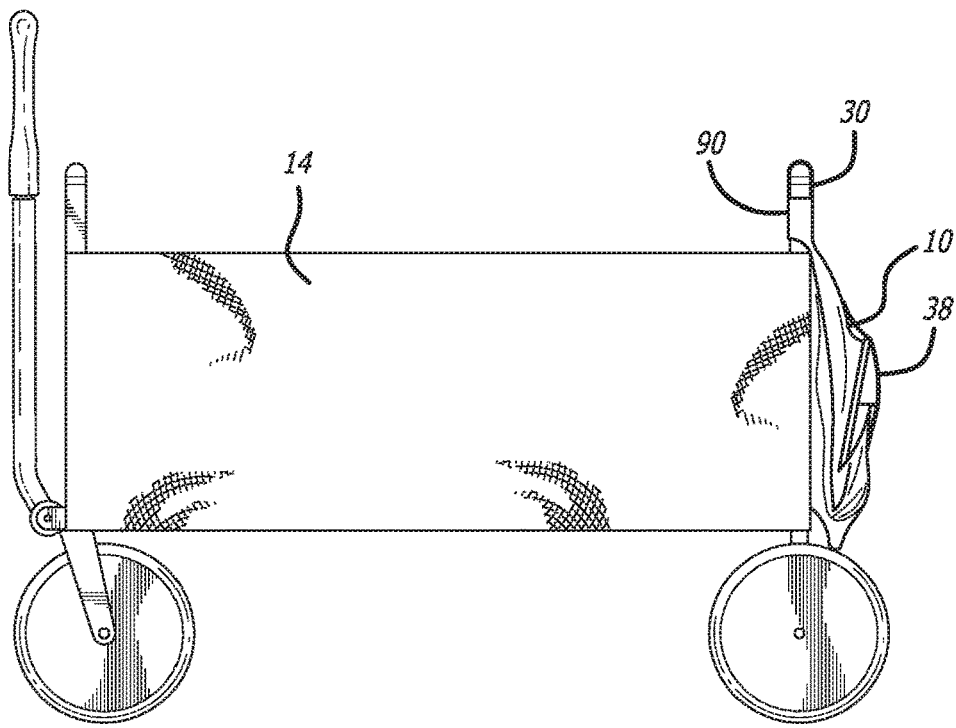
FIG. 4 is a side perspective view of the convertible cargo case of FIG. 3 in the folded configuration.
Figure 5:
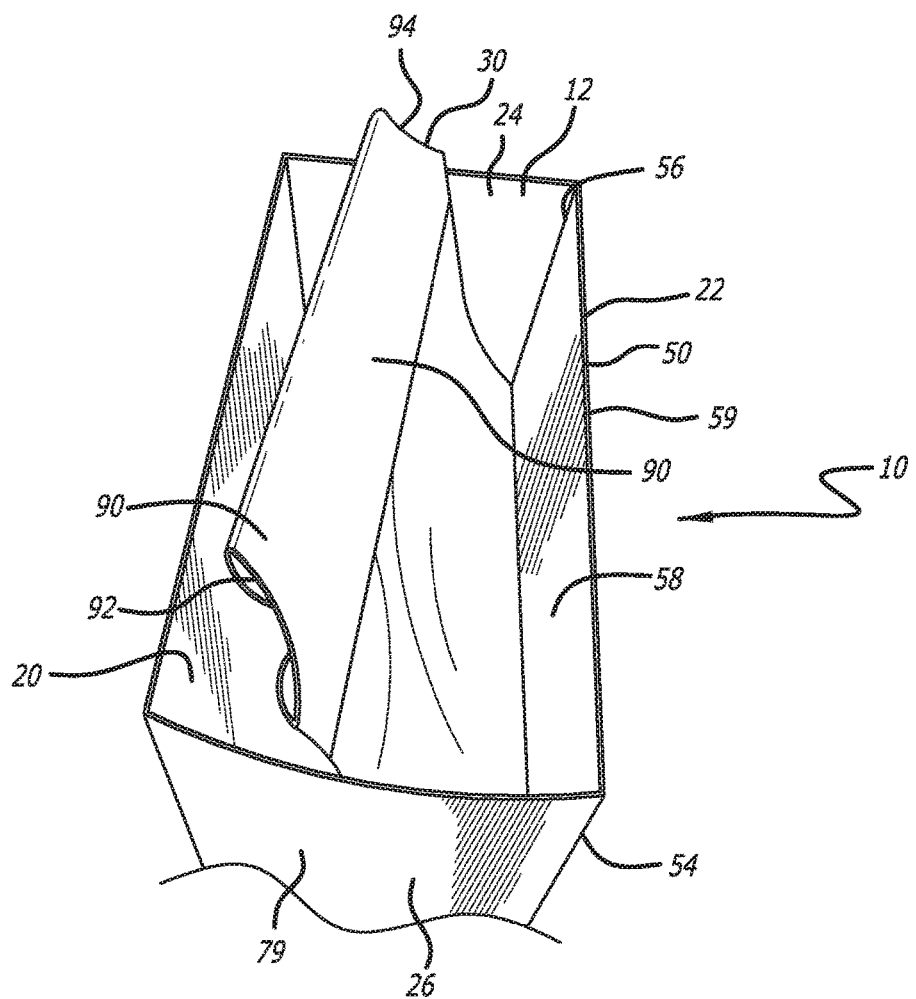
FIG. 5 is a top perspective view of the convertible cargo case of FIG. 1 removed from the foldable wagon.
Figure 6:
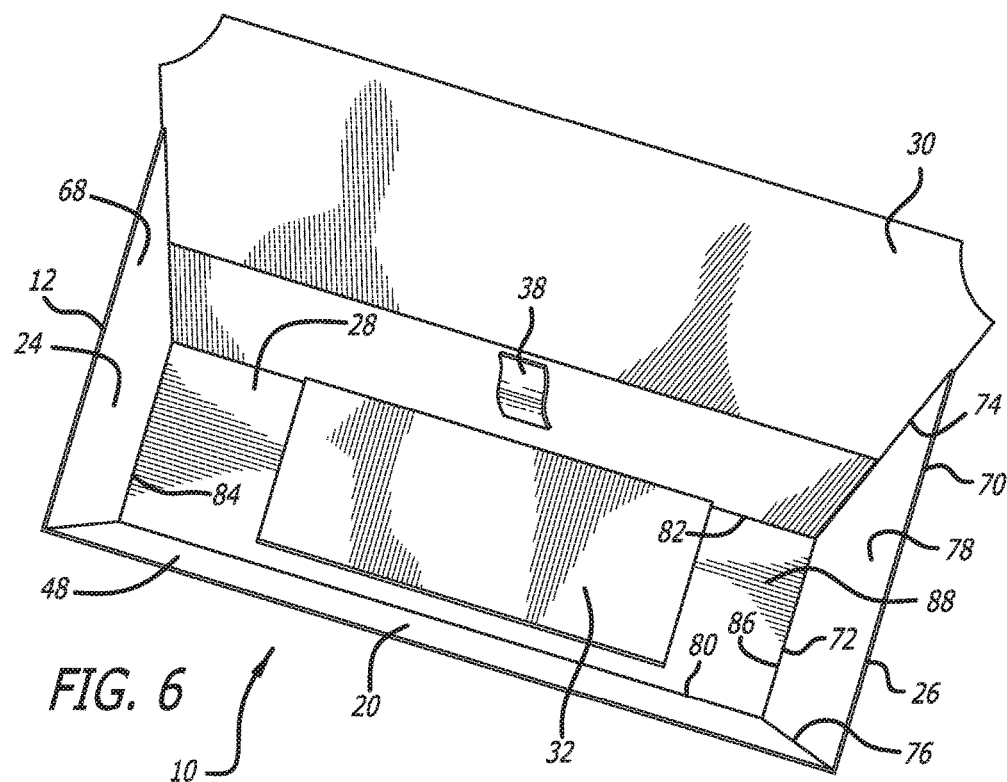
FIG. 6 is a top perspective view of the convertible cargo case of FIG. 1 in the use configuration.
Figure 7:
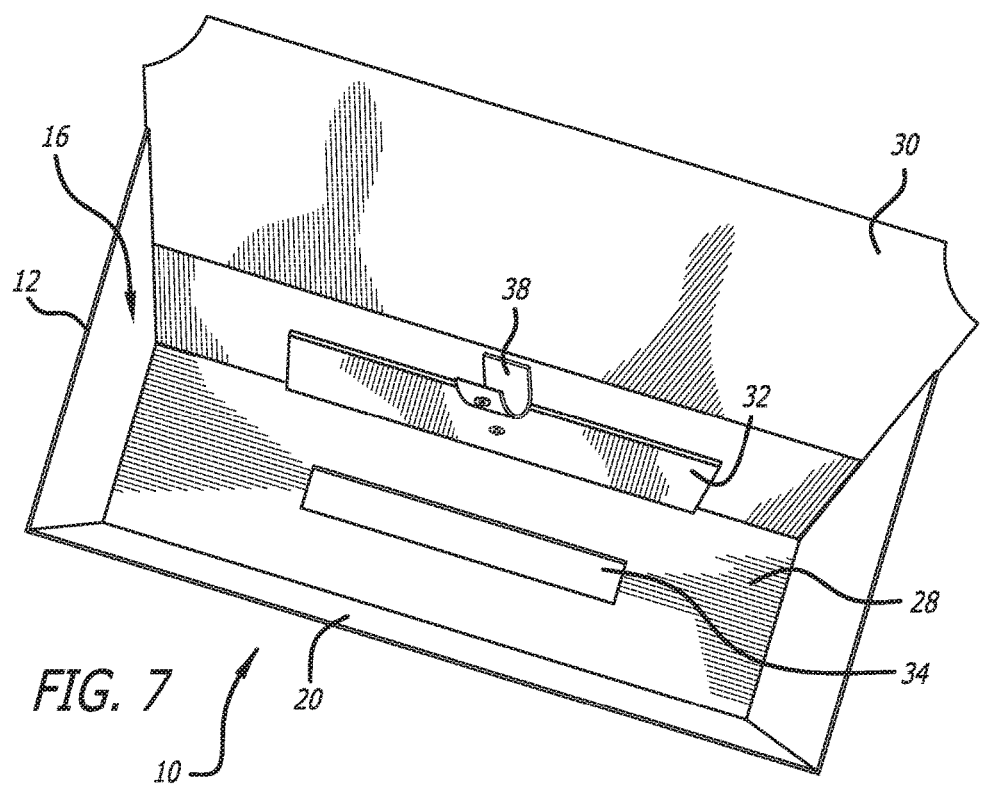
FIG. 7 is a top perspective view of the convertible cargo case of FIG. 1 in the use position prior to transition to the folded configuration.

As shown in FIGS. 5-7, the housing 12 of the cargo case 10 may comprise a first side wall 20, an opposing second side wall 22, a third side wall 24 extending between and preferably connecting the first side wall 20 and the second side wall 22, and a fourth side wall 26 that opposes the third side wall 24 and which extends between and preferably connects the first side wall 20 and the second side wall 22. The housing 12 may also comprise a bottom wall 28 that connects the first side wall 20, second side wall 22, third side wall 24 and fourth side wall 26. Additionally, in a preferred embodiment, the cargo case 10 also comprises a connector 30 that removably secures the cargo case 10 to the wagon 14 or other ride-on. In one embodiment the connector 30 extends from within the cavity 16 of the housing 12 and can be secured to the wagon 14 to secure the cargo case 10 in the use and folded cargo positions (FIGS. 1-4) as well as in the case position (FIGS. 8 and 9). In one embodiment the connector 30 extends from the joint between the second side wall 22 and the bottom wall 28. Alternately, the connector 30 may extend from the second side wall 22. Additional embodiments are also possible.

The cargo case 10 may also comprise a bottom member 32, as shown in FIGS. 6 and 7 that operates to both cover an opening 34 in the bottom wall 28, and which, in certain embodiments, operates as a rigid member for the housing 12 of the cargo case 10. In one embodiment the bottom member 32 extends from the joint between the second side wall 22 and the bottom wall 28. Additionally, the cargo case 10 may have first securing member 36 to secure a handle 37 of the wagon 14 to the cargo case 10 in the case use position as shown in FIG. 8, and a second securing member 38 to secure the housing 12 in the folded configuration as shown in FIG. 3.

Figure 3:
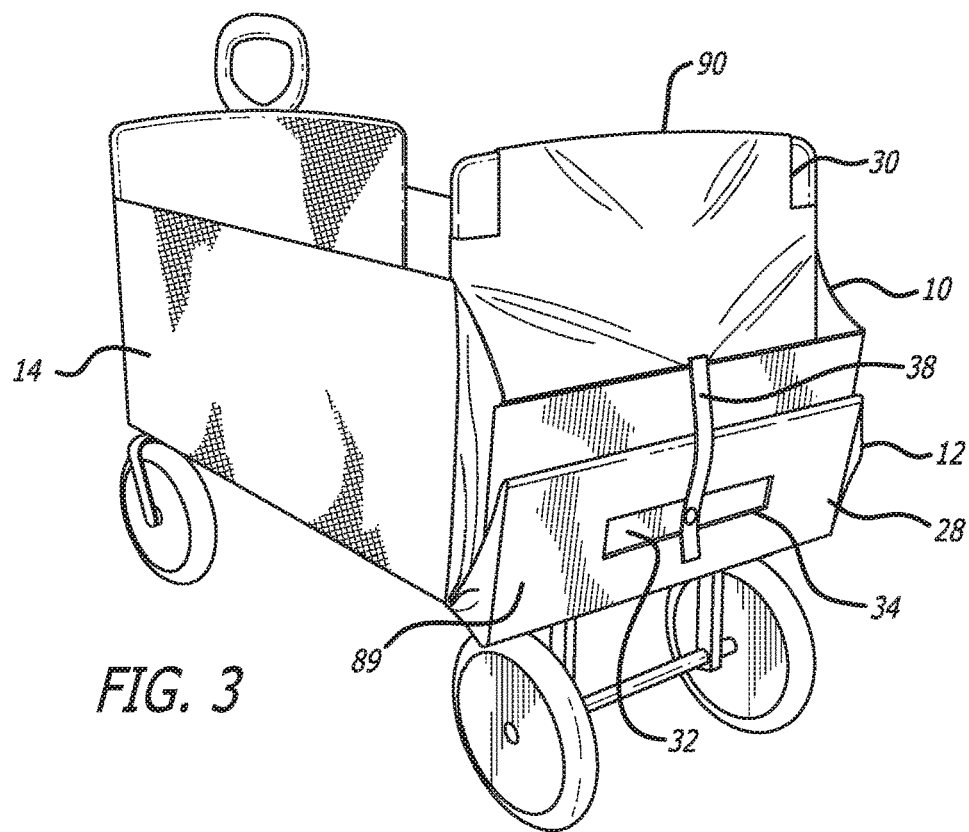
FIG. 3 is a front perspective view of the convertible cargo case of FIG. 1 connected to the foldable wagon with the convertible cargo case in the folded configuration.

In one embodiment various side walls of the housing 12 may have rigid members therein, or they may be made of rigid components as opposed to or in addition to a flexible fabric, to provide support and structure to the cargo case 10. For example, in one embodiment the second side wall 22 has a rigid member therein. Similarly, in one embodiment the bottom wall 28 has a rigid member therein. Finally, in one embodiment the first side wall 20 has a rigid member therein, however, the rigid member in the first side wall 20 may be made of multiple parts with a fold area 39 between the multiple parts to allow the first side wall 20 to fold in the collapsed or cargo-folded configuration/position as shown in FIGS. 3 and 4.

Referring to FIGS. 1, 5 and 6, in one embodiment the first side wall 20 has a first or top end 40, a second or bottom end 42, a first side edge 44, a second side edge 46, an interior surface 48 and an exterior surface 49. Similarly, the second side wall 22 has a first or top end 50, a second or bottom end 52, a first side edge 54, a second side edge 56, an interior surface 58 and an exterior surface 59. The third side wall 24 has a first or top end 60, a second or bottom end 62, a first side edge 64, a second side edge 66, an interior surface 68 and an exterior surface 69. The fourth side wall 26 has a first or top end 70, a second or bottom end 72, a first side edge 74, a second side edge 76, an interior surface 78 and an exterior surface 79. Finally, the bottom wall 28 has a first edge 80, a second edge 82, a third edge 84, a fourth edge 86, an interior surface 88 and an exterior surface 89. In one embodiment the interior surfaces of the first side wall 20, second side wall 22, third side wall 24, fourth side wall 26 and bottom wall 28 define the cavity 16 of the housing 12.

In one embodiment, the construction of the housing 12 of the cargo case 10 is as follows. The first side edge 64 of the third side wall 24 is connected to the first side edge 44 of the first side wall 20; the second side edge 66 of the third side wall 24 is connected to the second side edge 56 of the second side wall 22; and the bottom end 62 of the third side wall 24 is connected to the third edge 84 of the bottom wall 28. The first side edge 74 of the fourth side wall 26 is connected to the first side edge 54 of the second side wall 22; the second side edge 76 of the fourth side wall 26 is connected to the second side edge 46 of the first side wall 20; and the bottom end 72 of the fourth side wall 26 is connected to the fourth edge 86 of the bottom wall 28. Finally, the bottom end 42 of the first side wall 20 is connected to the first edge 80 of the bottom wall 28, and the bottom end 52 of the second side wall 22 is connected to the second edge 82 of the bottom wall 28. Accordingly, as explained above, in this configuration the interior surfaces 48, 58, 68, 78 and 88 of the first side wall 20, second side wall 22, third side wall 24, fourth side wall 26 and bottom wall 28, respectively, define the interior cavity 16 of the housing 12.

Referring to FIG. 5, in one embodiment, the connector 30 extends from the interior cavity 16 of the housing 12. As shown in FIG. 7, in a preferred embodiment the connector 30 is secured to the interior surface 58 of the second side wall 22. In a preferred embodiment the connector 30 is a flexible member, which, for example, may be made of a flexible fabric or other material, that has a receiver 90 for securing the connector 30 to the wagon 14 or other external component. Additionally, in one embodiment the connector 30 has cutouts 92 and 94 to provide relief areas for the wagon frame that is secured within the receiver 90. In a preferred embodiment, the connector 30 is a pocket that is secured at least partially around a rear wall or rear frame of a wagon 14.

Referring to FIGS. 7-9, the bottom wall 28 may have an aperture 34 that extends through the bottom wall 28 from the interior surface 88 thereof to the exterior surface 89 thereof. The aperture 34 is provided to allow a handle or hand grip 102 of the wagon 14 to extend through the housing 12 for carrying the cargo case 10 and wagon 14 together. In one embodiment the hand grip 102 extends from a bottom wall of the wagon 14.

Referring to FIGS. 3, 6 and 7, the cargo case 10 also includes a second securing member 38 for securing the cargo case 10 in the collapsed or cargo-folded configuration/position as shown in FIGS. 3 and 4. In one embodiment the second securing member 38 is secured to the interior surface 58 of the second side wall 22. Further, a receiver 12 may be secured to the bottom wall 28 or to the bottom member 32, which may be accessible through the aperture 34 in the bottom wall 28, for connecting the free end of the second securing member 38.

Figure 2:
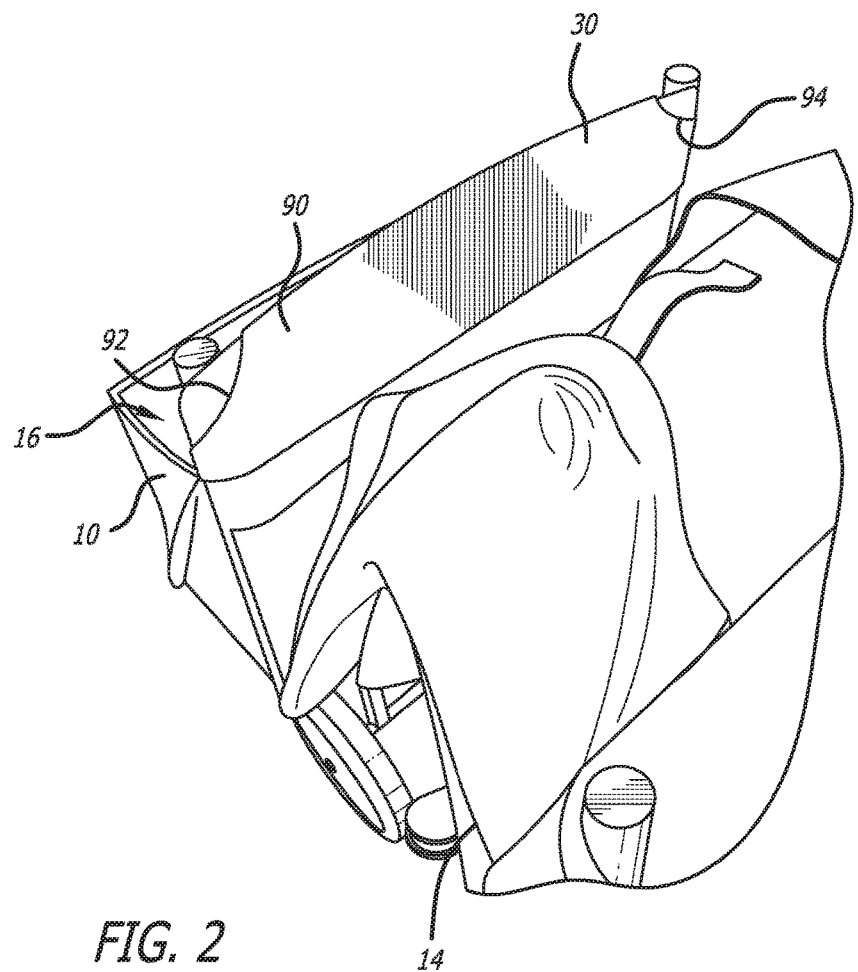
FIG. 2 is a rear perspective view of the convertible cargo case of FIG. 1, with the foldable wagon moving to a folded configuration.

Accordingly, the cargo case 10 is useable in a cargo carrying mode as shown in FIGS. 1 and 2, with cargo able to be retained in the cavity 16 of the housing 12. When no cargo is required to be retained in the cavity 16 of the housing 12, the cargo case 10 may be folded as shown in FIGS. 3 and 4 and secured in the folded position with the second securing member 38. Finally, when the user desires to fold the wagon 14 or other ride-on for transportation or storage, the cargo case 10 may be converted into a case in the case mode. To place the cargo case 10 in the case mode, the housing 12 is rotated on top of the folded wagon 14 and the folded wagon 14 is partially placed into the cavity 16 of the housing 12. Additionally, if it is desired to have a handle 102 of the wagon 14 extend through the aperture 34 in the bottom wall 28 of the housing 12 for carrying the wagon 14 and cargo case 10 together, it is preferred that the bottom member 32 within the cavity 16 of the housing 12 be moved and/or secured to the interior surface 58 of the second side wall 22 prior to placing the wagon 14 in the cavity 16 of the housing 12.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A convertible cargo case for a wagon, comprising:
   a housing comprising a first side wall; a second side wall opposing the first side wall; a third side wall joining one end of the first side wall and one end of the second side wall; a fourth side wall opposing the third side wall and joining an opposing end of the first side wall and an opposing end of the second side wall; and, a bottom wall joining a bottom end of the first side wall, second side wall, third side wall and fourth side wall to define a cavity of the housing;
   a rigid member at the bottom wall, the bottom wall having an opening therethrough;
   a connector extending from the cavity, the connector having a pocket for removably securing the housing to the wagon;
   wherein the housing is convertible between three configurations, an open cargo configuration, a closed cargo configuration, and a wagon storage configuration, and wherein the pocket is removably secured to the wagon in each configuration; and, a securing member connected to one of the second side wall and the connector, the securing member adapted to be secured to a bottom of the housing when the convertible cargo case is in the closed cargo configuration.

2. The convertible cargo case of claim 1, further comprising a rigid pivotable bottom member to selectively cover the opening in the bottom wall.

3. The convertible cargo case of claim 1, wherein the first side wall has a first rigid portion and a second rigid portion, and a fold area between the first rigid portion and the second rigid portion.

4. The convertible cargo case of claim 1, wherein the first side wall has a rigid portion thereto, wherein the second side wall has a rigid portion thereto, and wherein the third side wall and fourth side wall have a flexible portion thereto to allow the housing to collapse in the closed cargo configuration.

5. The convertible cargo case of claim 1, wherein the housing is positioned adjacent a rear of the wagon in the open cargo configuration and closed cargo configuration, and wherein the wagon is positioned partially within the cavity of the housing in the wagon storage configuration.

6. The convertible cargo case of claim 1, wherein the pocket has cutouts to allow a portion of the wagon to pass through the pocket.

7. A convertible cargo case for a wagon, comprising:
a housing comprising a first side wall; a second side wall opposing the first side wall; a third side wall joining one end of the first side wall and one end of the second side wall; a fourth side wall opposing the third side wall and joining an opposing end of the first side wall and an opposing end of the second side wall; and, a bottom wall joining a bottom end of the first side wall, second side wall, third side wall and fourth side wall to define a cavity of the housing; and,
a connector extending from the cavity, the connector having a receiver for removably securing the housing to the wagon, wherein the housing is convertible between three configurations, an open cargo configuration, a closed cargo configuration, and a wagon storage configuration, and wherein the connector is secured to the wagon in each configuration.

8. The convertible cargo case of claim 7, wherein the connector has a pocket that extends partially over a rear wall of the wagon.

9. The convertible cargo case of claim 8, wherein the pocket has cutouts to allow a portion of the wagon to pass through the pocket.

10. The convertible cargo case of claim 7, wherein the connector extends from the one of the second side wall of the housing and the bottom wall of the housing.

11. The convertible cargo case of claim 7, wherein the bottom wall has a rigid portion, and wherein the rigid portion of the bottom wall has an opening therethrough.

12. The convertible cargo case of claim 11, further comprising a rigid pivotable bottom member to selectively cover the opening in the bottom wall.

13. The convertible cargo case of claim 7, wherein the first side wall has a first rigid portion and a second rigid portion, and a fold area between the first rigid portion and the second rigid portion.

14. The convertible cargo case of claim 13, further comprising a securing member connected to one of the second side wall and the connector, the securing member adapted to be secured to a bottom of the housing to retain the housing in the closed cargo configuration.

15. The convertible cargo case of claim 7, wherein the first side wall has a rigid portion thereto, wherein the second side wall has a rigid portion thereto, and wherein the third side wall and fourth side wall have a flexible portion thereto to allow the housing to collapse in the closed cargo configuration.

16. The convertible cargo case of claim 7, wherein the housing is positioned adjacent a rear of the wagon in the open cargo configuration and closed cargo configuration, and wherein the wagon is positioned partially within the cavity of the housing in the wagon storage configuration.

17. A convertible cargo case for a wagon, comprising:
a housing comprising a first side wall; a second side wall opposing the first side wall; a third side wall joining one end of the first side wall and one end of the second side wall; a fourth side wall opposing the third side wall and joining an opposing end of the first side wall and an opposing end of the second side wall; and, a bottom wall joining a bottom end of the first side wall, second side wall, third side wall and fourth side wall to define a cavity of the housing; and,
a connector extending from the cavity, the connector having a receiver for removably securing the housing to the wagon, wherein the housing is convertible between three configurations, an open cargo configuration, a closed cargo configuration, and a wagon storage configuration, wherein the connector is secured to the wagon in each configuration, and wherein the housing is positioned adjacent a rear of the wagon in the open cargo configuration and closed cargo configuration, and wherein the wagon is positioned partially within the cavity of the housing in the wagon storage configuration.

18. The convertible cargo case of claim 17, wherein the bottom wall has a rigid portion, and wherein the rigid portion of the bottom wall has an opening therethrough.

19. The convertible cargo case of claim 17, further comprising a securing member connected to one of the second side wall and the connector, the securing member adapted to be secured to a bottom of the housing to retain the housing in the closed cargo configuration.

20. The convertible cargo case of claim 17, wherein the first side wall has a rigid portion thereto, wherein the second side wall has a rigid portion thereto, and wherein the third side wall and fourth side wall have a flexible portion thereto to allow the housing to collapse in the closed cargo configuration.

* * * * *